March 11, 1952 M. K. ZINN 2,589,184

ELECTRONIC IMPEDANCE EQUALIZER

Filed Sept. 13, 1949 2 SHEETS—SHEET 1

INVENTOR
M. K. ZINN

BY N. D. Ewing
ATTORNEY

INVENTOR
M. K. ZINN
BY N. S. Ewing
ATTORNEY

Patented Mar. 11, 1952 2,589,184

UNITED STATES PATENT OFFICE 2,589,184

ELECTRONIC IMPEDANCE EQUALIZER

Manvel K. Zinn, Manhasset, N. Y., assignor to Bell Telephone Laboratories, Incorporated, New York, N. Y., a corporation of New York Application September 13, 1949, Serial No. 115,421

14 Claims. (Cl. 178—44)

This invention relates to electrical transmission systems and more particularly to electrical impedance equalizing devices therefor.

It is well known in the communication art that when a train of electric waves traveling down a line of a given characteristic impedance encounters a junction with another line having a different characteristic impedance, a portion of the wave train is reflected in a direction opposite to that of the desired transmission. The same effect occurs where the waves arrive at an amplifying device or any other form of impedance having an impedance value different from and thereby not matching the line impedance. Such reflections are, in one aspect, undesirable because they result in a loss of part of the wave energy. Further, where the impedance difference varies with frequency, the portion of the wave transmitted in the desired direction suffers a distortion of its form, thus impairing the information content of the signals. The reflected portions of the wave also impair the transmission in various ways. For example, in a long telephone circuit having many amplifiers the reflected waves produce disturbing echoes, and on long television circuits they produce after images, commonly referred to as ghosts.

It is a principal object of the present invention to reduce or substantially eliminate wave reflections at a junction point of dissimilar impedances.

Another object of the invention is to provide transmission gain by reducing, or substantially eliminating, reflections.

Another object of the invention is to obtain an increased ratio of transmitted signal power to the thermal agitation noise power at a one-way line amplifier.

A further object of the invention is to reduce reflection at a mismatched junction point without incurring transmission losses and/or distortion of the wave form that frequently occurs where passive impedance equalizing elements such as transformers or networks comprising inductance, capacitance and resistance are employed to reduce reflection at such a junction point.

These objects are accomplished in a simple embodiment of the invention to be hereinafter described by inserting at the junction point of dissimilar impedances, a four-terminal vacuum tube circuit comprising an impedance bridge and an inverse feed-back arrangement whereby to return to the line a current equal and opposite to the reflected current, thereby canceling the reflected signal waves and at the same time maintaining an improved ratio of signal-to-thermal noise.

A particular feature of the invention resides in the separate feedback circuit at the junction of a transmission line and the input or output of a one-way amplifier to avoid reflection without affecting the main transmission path through, or the operation of, the main amplifier.

A further feature of the invention resides in the "series return" and "shunt return" modes of connecting the four-terminal impedance equalizer at a point of dissimilar impedances.

Still other features of the invention reside in the interstage networks and the particular manner in which the impedance components thereof are chosen.

The nature of the present invention and its various objects, features and advantages will appear more fully upon consideration of the embodiments illustrated in the accompanying drawings and the following detailed description thereof:

Figure 1:
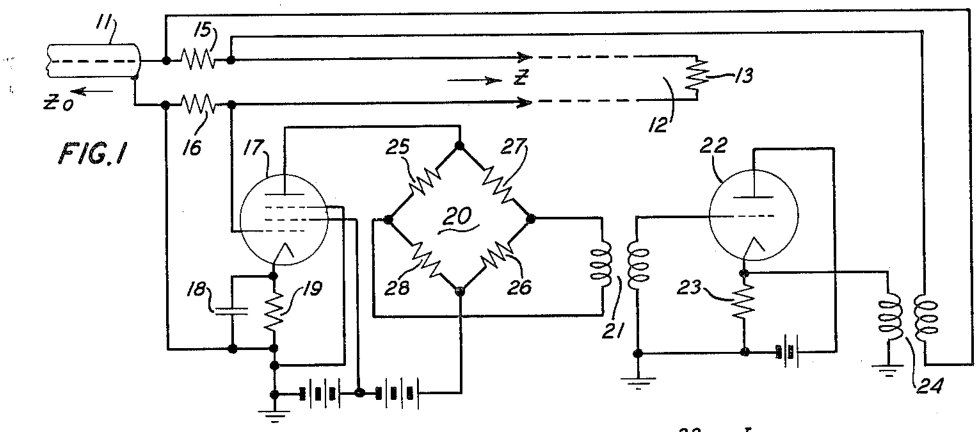
Fig. 1 shows schematically an impedance equalizer of the series return type.

Referring to Fig. 1, a simple embodiment of the series return mode is shown whereby to eliminate transmission impairments due to an impedance mismatch between a transmission line of a certain impedance and a terminating load of a different impedance. By way of illustration a coaxial transmission line 11 having a characteristic impedance of $Z_0$ is shown connected to an open wire transmission line 12 terminated by impedance 13 and having an impedance Z. The terminating load 12, however, may be a second coaxial line, the input of an amplifier circuit as will be shown later, or any other terminating impedance.

The connection between the lines $Z_0$ and Z is made by means of resistors 16 and 15, each connected in series with one side of the terminating load 12 and each of value sufficiently small that the voltage impressed by line 11 may be considered as appearing across load 12. The resulting small voltage developed across resistor 16 is applied to the grid of tube 17, which is illustrated as a pentode type tube, self-biased by resistor 19 and condenser 18. The load of tube 17 comprises bridge circuit 20 made up of impedances 25, 26, 27 and 28. A portion of the signal developed across bridge 20 is applied by means of transformer 21 to cathode-follower stage 22. The output signal thereof, taken across resistor 23, is applied through transformer 24 across resistor 15.

In accordance with the invention, wave reflections at the dissimilar impedance junction are substantially eliminated by choosing the above-described components so that the voltage potential developed across resistor 15 is $(Z_0-Z)$ times the transmitted line current transmitted into the load 12 of impedance Z. This will immediately become apparent from the following analysis of the effects and reflection properties of a mismatched impedance junction.

Consider therefore the transmission line 11 having an impedance $Z_0$ and terminated by 12, a second impedance Z. The current delivered to Z will be the algebraic sum of the incident and reflected current. The incident current, I, is that which would flow through the junction if the impedances were matched. That is, $$I=\frac{E}{2Z_0} \quad (1)$$

where E is the open-circuit voltage of the first transmission line. The reflected current is $$I_R=-\rho I \quad (2)$$

and the transmitted current is $$I_T=(1-\rho)I \quad (3)$$

where $\rho$ is the reflection coefficient, defined by $$\rho=\frac{Z-Z_0}{Z+Z_0} \quad (4)$$

The transmitted current bears a definite relation to the reflected current, namely $$I_R=I_T\frac{\rho}{\rho-1}=I_T\frac{Z_0-Z}{2Z_0} \quad (5)$$

In accordance with the principles of the invention, it is proposed to cancel the reflected current $I_R$ by introducing a current at the junction point in phase opposition to $I_R$ having a magnitude $$I_R=I_T\frac{Z_0-Z}{2Z_0} \quad (6)$$

The effects of junction mismatch are thereby eliminated for one direction of transmission, namely from $Z_0$ into Z. Such elimination of reflected current power is accompanied by a transmission gain equal to the ratio $$\frac{I_1}{I}=\frac{Z+Z_0}{2Z_0} \quad (7)$$

where I and $I_1$ are the currents in Z before and after connecting the device respectively. This gain is effective for both directions of transmission.

An argument similar to the above could be given in terms of voltages and would differ from the above argument in terms of currents only in the reversal of the sign of the reflection coefficient.

The requirements of the circuit necessary to introduce the above proposed current may be more easily analyzed in terms of a voltage which must be introduced at the point of junction, i. e., the voltage which must be developed across resistor 15 in order that a current equal to $I_R$, but of opposite phase relation, may flow to cancel the reflected current. Further, it will be useful to express this voltage in terms of the transfer impedance $\zeta$ of the return circuit, i. e., the ratio of the return voltage to the current in the junction.

Figure 2:
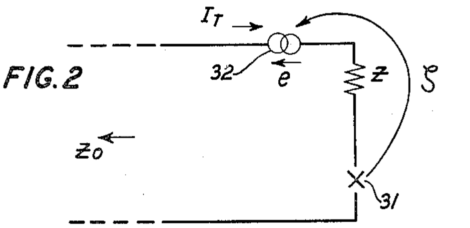
Fig. 2 illustrates, by way of explanation, the equivalent circuit thereof.

For these reasons the equivalent circuit of Fig. 1 is shown in Fig. 2, wherein the return voltage $e$ is represented by generator 32 and has a value equal to the product of the transfer impedance $\zeta$ and the current $I_T$ flowing at point 31. Thus points 31 and 32 of Fig. 2 correspond to resistors 16 and 15 of Fig. 1, respectively.

If the return voltage $e$ annuls the reflected current $I_R$, it may be shown that $$\frac{e}{2Z_0}=I_R=I_T\frac{Z_0-Z}{2Z_0} \quad (8)$$

Thus the voltage introduced by generator 32 must be equal to $$e=I_T(Z_0-Z) \quad (9)$$

and the transfer impedance of the return circuit is $$\zeta=\frac{e}{I_T}=(Z_0-Z) \quad (10)$$

In other words, in order that no reflections occur from the termination of the transmission line having impedance $Z_0$ by a terminal impedance Z, a voltage may be inserted in series at the point of junction 32 having a value $(Z_0-Z)$ times the current flowing through the junction at point 31.

Thus in the circuit of Fig. 1, a voltage is obtained from resistor 16 proportional to the current transmitted down the line, multiplied by the factor $(Z_0-Z)$ by the amplifier circuit consisting of tubes 17 and 22 and bridge circuit 20, applied through transformer 24 to the small resistor 25, and thus inserted in series with the line circuit to substantially cancel reflection.

It will now be shown how the amplifier circuit including bridge circuit 20 can be designed to accomplish the functions set forth in the preceding description. As pointed out, the circuit from resistor 16 to resistor 15 is required to have a transfer impedance equal $(Z_0-Z)$. Since in many practical applications the values of $Z_0$ and Z will vary considerably over the range of frequencies to be transmitted, a circuit design may be obtained by incorporating the required transmission characteristic in the interstage network 20, while making the transmission through the remaining elements of the amplifier substantially constant over the significant frequency range. Many other amplifier circuits providing the required function may, however, be assigned by those skilled in the art in accordance with the invention.

Figure 3:
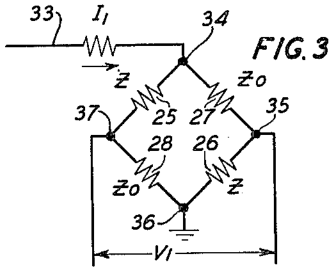
Fig. 3 illustrates, by way of detailed explanation, the bridge circuit of Fig. 1.

In Fig. 3 the bridge circuit 20 has been disassociated from the other circuit elements of the amplifier in order to show the significant transmission features more clearly. By way of example the bridge illustrated comprises impedances 25, 26, 27 and 28. Impedances 27 and 28 are of such value to simulate the transmission line characteristic impedance $Z_0$ and impedances 25 and 26 simulate the impedance Z of the terminating circuit. Input terminal 33 receives a current $I_1$ from a source of such high impedance, for example pentode 17, that the value of current $I_1$ is substantially independent of the relatively low impedances Z and $Z_0$ of the bridge. Output terminals 37 and 35 are regarded as open for practical purposes, since they are connected to the relatively high impedance of the input circuit of triode 22. Under these conditions, a current $$\frac{I_1}{2}$$

flows to ground at terminal 36 through each half of the bridge. Thus the difference of potential between output terminals 37 and 35 is evidently $$V_1=\frac{I_1}{2}(Z_0-Z) \qquad (11)$$

The transfer impedance of the bridge is therefore $$\frac{V}{I_1}=\frac{1}{2}(Z_0-Z) \qquad (12)$$

Thus, half of the transfer impedance desired for the over-all return circuit is obtained from the bridge network 20. It is required therefore that the remaining circuit elements supply a transfer impedance of the value of 2, independent of frequency. This is easily done, for example, by adjusting the gain of pentode stage 17.

It may be shown by well-known circuit analyses for example, such as that taught by H. W. Bode in United States Patent 2,123,178, granted July 12, 1938, that such a feedback circuit is inherently stable because the characteristic determinant of the system has a value of $2Z_0$, and the roots of this quantity, if considered as a function of $\rho=2\pi$ if, will lie in the left half of the $\rho$-plane.

The series return mode circuit, so denoted since the annulling current is fed back in series with the line, as heretofore shown and discussed with relation to Fig. 1, is particularly adapted when Z and $Z_0$ are high impedance terminations. It is also possible to obtain the desired result by feeding back a current into the junction. This is termed the "shunt return" mode and is particularly adapted to stable elimination of reflection when the terminating load is of relatively low impedance.

Figure 4:
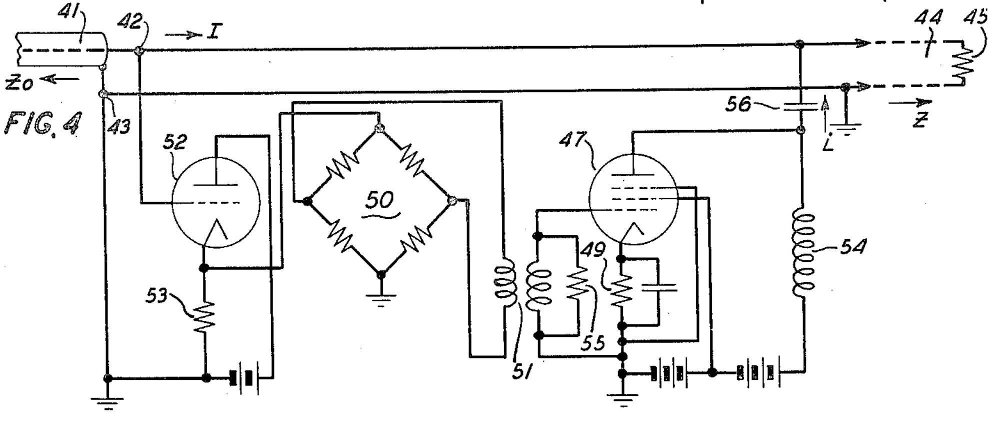
Fig. 4 shows schematically an impedance equalizer of the shunt return type.

Fig. 4 illustrates by way of example a particular embodiment of the invention. Thus, a circuit configuration incorporating the principles of the shunt return mode is shown in which a transmission line 41 of characteristic impedance $Z_0$ is terminated by a load 44 having an impedance Z.

A voltage is obtained from across the line at points 42 and 43 and is applied to the grid of tube 52, shown by way of example as a cathode follower. The output of tube 52, taken across the low impedance cathode resistor 53, is applied to bridge 50. The bridge output voltage is applied through transformer 51 across the grid resistor 55 of tube 47. Resistor 55 is of such low resistance that the impedance reflected back to bridge 50 through transformer 51 appears substantially a short circuit as compared with the impedance value of either Z or $Z_0$. The plate voltage of tube 47 is supplied through high impedance inductance 54 to assure that the output thereof will appear a high impedance current source. The alternating component of the output current $i$ is fed through blocking condenser 56 to line 44 and returns to ground through the terminal impedance Z.

In accordance with the invention, wave reflections at the dissimilar impedance junction are substantially eliminated by choosing the above-described components so that the current $i$ sent through condenser 56 and the terminating load 44 is $(Y-Y_0)$ times the voltage across the junction, where Y and $Y_0$ represent the value of admittance of the terminating load 44 and the transmission line 41, respectively; that is, $$Y=\frac{1}{Z} \text{ and } Y_0=\frac{1}{Z_0}$$

Figure 5:
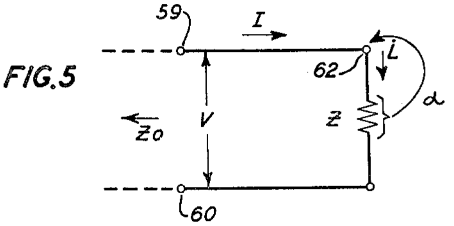
Fig. 5 illustrates, by way of explanation, the equivalent circuit thereof.

As in the series return mode case, it will be useful to express this current in terms of the transfer admittance $\alpha$ of the return circuit, i. e., the ratio of the feedback current to the voltage across the junction terminals. For this reason, the equivalent circuit of Fig. 4 is shown in Fig. 5, wherein, the return current $i$, inserted at point 62, is shown related to the voltage across Z by the function $\alpha$.

Assuming that a voltage V is applied between points 59 and 60 causing a current I to flow through impedance Z, it is apparent that in order to prevent reflections that $$\frac{I}{V}=Y_0 \qquad (13)$$

Since $$VY=I+i \qquad (14)$$

where $i$ is represented by the product of voltage V and transfer admittance $\alpha$, and $$\frac{I}{V}=Y-\alpha \qquad (15)$$

the transfer admittance $\alpha$ is seen to require the above-mentioned value of $$\alpha=Y-Y0 \qquad (16)$$

In other words, reflections are prevented at the junction point by inserting a current at the point of junction having a value $(Y-Y0)$ times the voltage across the junction.

Thus in the circuit of Fig. 4, a voltage is obtained across points 42 and 43, multiplied by the factor $(Y-Y0)$ by the amplifier circuit consisting of tubes 52 and 47 and bridge circuit 50, and the resulting alternating current $i$ applied to the line. These requirements are met if the amplifier circuit from terminals 42 and 43 to output condenser 56 be designed to have a transfer admittance of $(Y-Y0)$. As in the series return mode case discussed hereinabove in relation to Fig. 1, the required transmission characteristic may be incorporated in interstage bridge network 50.

Figure 6:
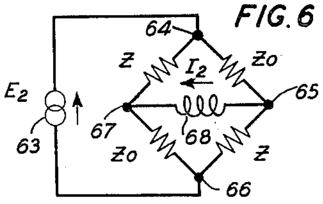
Fig. 6 shows the bridge circuit of Fig. 4.

Thus by way of example, Fig. 6 illustrates a bridge circuit satisfying these conditions. The low impedance voltage source of the cathode follower resistor 53 is represented by generator 63 having a voltage $E_2$, which value of output voltage appears independent of impedance variations due to frequency in the relatively high impedances Z and Z0. Terminals 65 and 67 are connected by impedance 68, which represents the impedance into transformer 51 terminated in resistance 55 of Figure 4. This impedance, which is pointed out hereinabove is so small relative to Z and $Z_0$ that points 65 and 67 may be considered as short circuited. Under these conditions, the potential drops from 64 to 67 and 64 to 65 are the same as those from 67 to 66 and 65 to 66. The current flowing from 64 to 67 must be equal to that flowing from 65 to 66, the value of this current being $E/2Z$. Also the current flowing from 64 to 65 must be equal to that flowing from 67 to 66, the value of this current being $E/2Z_0$. Thus the circuit between consecutive terminals 64, 67, 65 and 66 has a current of $E/2Z$ and the circuit between consecutive terminals 64, 65, 67 and 66 has a current of $E/2Z_0$. It follows that the current $I_2$ flowing through the low impedance 68 must be the difference of these two currents, or equal $$I=\frac{E}{2}\left(\frac{1}{Z}-\frac{1}{Z_0}\right)=\frac{E}{2}(Y-Y_0) \qquad (17)$$

The transfer admittance of the bridge is therefore $$\frac{I}{E}=\frac{1}{2}(Y-Y_0) \qquad (18)$$

Thus, half of the required transfer admittance for the over-all return circuit is supplied by bridge 50. It is therefore necessary that the remainder of the circuit components furnish a transfer admittance of magnitude 2, independent of frequency. This may be done quite readily by adjusting the gain of pentode 47.

In the figures, a coaxial transmission line has been shown as connected directly to an open-wire transmission line and the impedance difference therebetween matched by the insertion of the four terminal network at the point of junction. It should be pointed out, however, that in many practical applications it might be desirable to isolate the two circuits by means of a transformer of the type having an electrostatic shield between the windings thereof to prevent any longitudinal noise currents which may be flowing in the open-wire line from producing metallic noise currents in the coaxial line. The transformer may have a turns ratio chosen to reduce a gross impedance mismatch at the junction point and the four-terminal device applied in accordance with the invention to eliminate any last remaining impedance irregularity.

Figure 7:
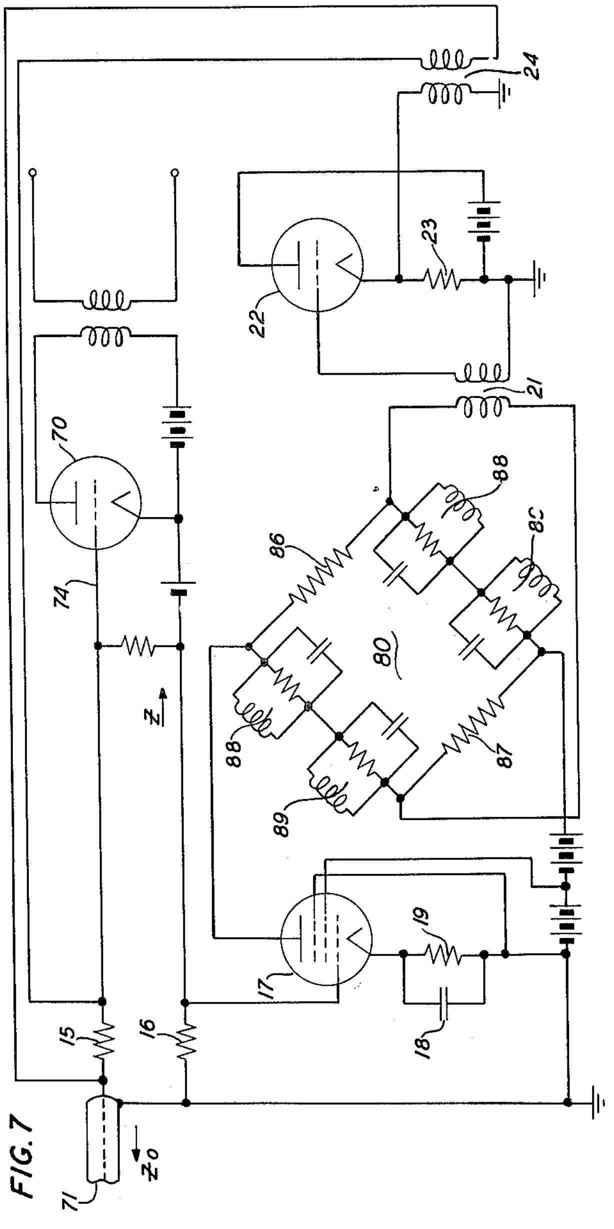
Fig. 7 shows schematically a particular embodiment of the invention wherein the four-terminal impedance equalizer is incorporated at the input of a one-way amplifier.

The invention as described hereinbefore has contemplated two transmission lines, or a transmission line and a terminal apparatus absorbing or delivering power. When the line is connected to the input of a one-way vacuum tube amplifier, the conditions merit special consideration. Thus, Fig. 7 shows a transmission line 71 of impedance $Z_0$ connected to the input grid 74 of a one-way amplifier 70 having an input impedance Z.

Under such conditions, reflections would ordinarily occur at the amplifier input since it is difficult to match such an input to a transmission line over a wide range of frequencies by means of transformers or other passive impedance equalizing elements. In many cases a large mismatch of impedances is intentionally introduced to gain an advantage with respect to noise. This advantage arises from the fact that where thermal agitation noise is the controlling source of interference, a 3 decibels advantage in signal-to-noise ratio can be gained by making the input impedance of the amplifier much greater than that of the line. This noise advantage, of course, is gained at the expense of undesirable reflection effects. However, by employing the principles of the invention as shown in Fig. 7, it is possible to maintain an impedance match between the line and the amplifier, while at the same time realizing the aforesaid advantage over noise.

Thus the input impedance Z of the amplifier 70 can be made to have any large value chosen. For example, Z may be much larger than the line impedance $Z_0$ in order to obtain the largest possible ratio of signal-to-noise. When operation of the four-terminal device is applied both signal and noise voltages on the grid will be increased by the same factor, and the signal-to-noise ratio will not be changed. This factor has been shown by Equation 7 hereinabove to be equal $$\frac{Z+Z_0}{2Z_0} \qquad (19)$$

and the undesirable effects therefrom will be substantially reduced or eliminated in the manner described in relation to Fig. 1.

The four-terminal device as shown on Fig. 7 is connected in the series return mode by means of resistors 16 and 25. The component arrangement therein is identical to that shown in Fig. 1 and corresponding reference numerals have been employed with the exception of bridge network 80 as will be noted hereinafter. The shunt return mode of Fig. 4 may likewise be used at the input of an amplifier with the same advantages.

Additional consideration must be given to the bridge network 80 when the four-terminal device is incorporated at the input of one-way amplifier because of the complex variation of the amplifier input impedance Z when plotted as a function of frequency.

Figure 8:
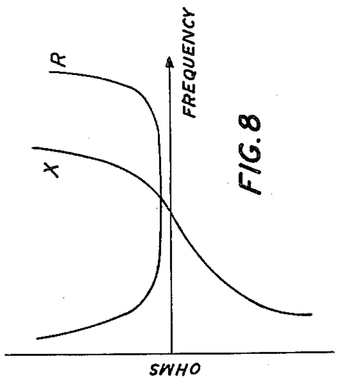
Fig. 8 illustrates by way of explanation the input impedance characteristic of a one-way amplifier.

Fig. 8 illustrates a typical characteristic curve of an amplifier input impedance, $Z=R+iX$, plotted as a function of frequency. Such an impedance may be represented, as the case may require, by various combinations of a resistance, capacitance and/or inductance. Thus in bridge network 80, the input impedance of the amplifier is simulated by the parallel component combinations 88 and 89. The characteristic impedance of the transmission line may be represented in this case over the significant frequency range with a satisfactory degree of precision by a pure resistance shown as 86 and 87 in the bridge circuit.

Figure 9:
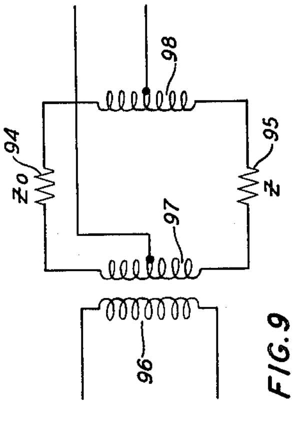
Fig. 9 shows an alternate bridge configuration in accordance with the invention.

Fig. 9 illustrates an alternate form of interstage network which may be substituted for the bridge circuits 20, 50 or 80 in Figs. 1, 4 and 7, respectively. The circuit employs a three-winding output transformer having windings 96, 97 and 98, similar to the well-known hybrid coil. Impedances 94 and 95 to simulate the line impedance $Z_0$ terminal impedance Z, respectively, are connected as shown between windings 97 and 98. Such a network has the advantage as compared to the above-mentioned bridge circuits of requiring only one network impedance $Z_0$ to match the impedance of the line and one impedance Z to match the impedance of the terminating load, rather than requiring two networks of each kind. Windings 96, 97 and 98 of the transformer in addition may perform the function of the transformers 21 or 51 in Figs. 1, 4 and 7.

In all cases it is to be understood that the above-described arrangements are in broader aspects illustrative only of the application of the principles of the invention. Numerous other arrangements may be devised by those skilled in the art without departing from the spirit and scope of the invention.

What is claimed is:

1. In a transmission system including a transmission line and a terminal load, means for avoiding reflected waves at the junction point of said transmission line and said terminal load, said means comprising a multistage amplifier having the input circuit thereof and the output circuit thereof connected at said junction point, and an interstage coupling circuit included in said amplifier, said interstage coupling circuit comprising an impedance bridge having at least an arm simulating the characteristic impedance of said transmission line and an arm simulating the impedance of said terminal load.

2. In combination, a transmission line having a characteristic impedance, a terminating load having a different characteristic impedance connected thereto, a first amplifier means having an input circuit connected at said transmission line connection point, an impedance bridge connected in the output circuit of said amplifier means, said bridge comprising impedance components simulating said transmission line characteristic impedance and said load characteristic impedance, and a second amplifier means having an input circuit connected to said bridge and an output circuit connected at said transmission line connection point.

3. The combination according to claim 2 wherein said first amplifier means has a high output impedance as compared with both said load impedance and said transmission line impedance, and said second amplifier means has a high input impedance and a low output impedance as compared with both said load impedance and said transmission line impedance.

4. The combination according to claim 2 wherein said first amplifier means input circuit and said second amplifier means output circuit are connected substantially in series with said transmission line and said load impedance.

5. The combination according to claim 2 wherein said first amplifier means has a low output impedance as compared with both said load impedance and said transmission line impedance and said second amplifier means has a low input impedance and a high output impedance as compared with both said load impedance and said transmission line impedance.

6. The combination according to claim 2 wherein said first amplifier means input circuit and said second amplifier means output circuit are connected substantially in shunt with said transmission line and said load impedance.

7. In combination, a first transmission means having an output impedance, a second transmission means having an input impedance connected to said first transmission means, a first amplifier means having an input circuit and an output circuit, said input circuit being connected at said transmission means connection point, an impedance bridge connected in said output circuit, said bridge circuit having a transfer impedance substantially proportional to the difference between said first transmission means impedance and said second transmission means impedance, and a second amplifier means connected between said bridge circuit and said transmission means connection point.

8. The combination according to claim 7 wherein said bridge circuit comprises a plurality of impedance components simulating said first transmission means impedance and a second plurality of impedance components simulating said second transmission means impedance.

9. The combination according to claim 7 wherein said bridge circuit comprises a three-winding transformer having a first impedance simulating said first transmission means connected between the one end points of two of said windings, and a second impedance simulating said second transmission means connected between the other end points of said two windings.

10. In combination, a transmission line having characteristic impedance, a first amplifier means having an input impedance connected to said transmission line, a second amplifier means having an input circuit and an output circuit, said input circuit being connected at said first amplifier input, an impedance bridge connected in the output circuit of said second amplifier means, said bridge comprising impedance components simulating said transmission line impedance and said first amplifier input impedance, and a third amplifier means connected between said bridge circuit and said first amplifier input circuit.

11. In combination, a current source of electric signals having an output circuit of a first impedance, a transmission means having an input circuit of a second impedance for utilizing said signals, at least two resistance means interposed in series between said source output circuit and said transmission means input circuit and forming a connection therebetween, and an amplifier means having an input circuit and an output circuit, said amplifier input circuit comprising one of said resistance means and said amplifier output circuit comprising the other of said resistance means, said amplifier means having a transfer impedance from the input circuit thereof to the output circuit thereof equal both in magnitude and phase to the difference between said first impedance and said second impedance.

12. In combination, a current source of electric signals having an output circuit of a first admittance, a transmission means having an input circuit of a second admittance connected to said current source, and an amplifier means having an input circuit thereof and an output circuit thereof connected across said transmission means connection point, said amplifier means having a transfer admittance from said amplifier input circuit to said amplifier output circuit equal both in magnitude and phase to the difference between said first admittance and said second admittance.

13. In combination, a current source of electric signals having an output circuit of impedance $Z_0$, an amplifier means having an input impedance $Z$ connected to said source to receive transmitted current from said source, the magnitude of $Z$ being very large as compared with the magnitude of $Z_0$, means separate from said amplifier connected at said input connection point for obtaining an indication of said transmitted current, means for producing a second current directly related in both magnitude and phase to said indication by a factor $$\frac{Z_0-Z}{2Z_0}$$

and means for interposing said second current into said connection.

14. In combination, a source of electrical current signals having an output impedance $Z_0$, a transmission means having an impedance Z different from said output impedance, said transmission means being connected to said source at an electrical point, means for obtaining an indication of the current transmitted from said source to said transmission means, means for producing a second current directly related in both magnitude and phase to said indication by a factor $$\frac{Z_0 - Z}{2Z_0}$$

and means for interposing said second current at said connection point.

MANVEL K. ZINN.

REFERENCES CITED

The following references are of record in the file of this patent:

UNITED STATES PATENTS

| Number | Name | Date |
|---|---|---|
| 1,985,353 | Rhodes | Dec. 25, 1934 |
| 2,209,955 | Black | Aug. 6, 1940 |

FOREIGN PATENTS

| Number | Country | Date |
|---|---|---|
| 855,390 | France | Feb. 12, 1940 |